US006359030B1

(12) United States Patent
Tsuda et al.

(10) Patent No.: US 6,359,030 B1
(45) Date of Patent: Mar. 19, 2002

(54) AQUEOUS RESIN DISPERSION COMPOSITION

(75) Inventors: Nobuhiko Tsuda; Katsuhiko Imoto; Nobuo Mitsuhata; Masaru Nagato, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/529,984

(22) PCT Filed: Oct. 13, 1998

(86) PCT No.: PCT/JP98/04605

§ 371 Date: Apr. 24, 2000

§ 102(e) Date: Apr. 24, 2000

(87) PCT Pub. No.: WO99/21921

PCT Pub. Date: May 6, 1999

(30) Foreign Application Priority Data

Oct. 24, 1997 (JP) ............................................. 10-292511
Oct. 24, 1997 (JP) ............................................. 10-292512

(51) Int. Cl.$^7$ ............................................... C08L 83/00
(52) U.S. Cl. ....................................... 523/201; 524/535
(58) Field of Search ............................ 524/501; 523/201

(56) References Cited

U.S. PATENT DOCUMENTS

| 4,308,359 A | * | 12/1981 | Buning | 525/276 |
| 4,464,506 A | * | 8/1984 | Alberts | 524/588 |
| 4,636,545 A | * | 1/1987 | Konig | 524/457 |
| 4,730,021 A | * | 3/1988 | Zom | 524/457 |
| 4,767,821 A | * | 8/1988 | Lindner | 525/72 |
| 4,780,490 A | * | 10/1988 | Mizuno | 523/201 |
| 4,837,267 A | * | 6/1989 | Malhotra | 524/535 |
| 5,115,013 A | * | 5/1992 | Rottger | 524/457 |
| 5,126,411 A | * | 6/1992 | Rauterkus | 525/455 |
| 5,231,131 A | * | 7/1993 | Chu | 524/504 |
| 5,296,165 A | * | 3/1994 | Shimizu | 252/311 |
| 5,506,281 A | * | 4/1996 | Muhlbauer | 523/201 |
| 5,639,805 A | * | 6/1997 | Park | 523/201 |

FOREIGN PATENT DOCUMENTS

| EP | 0 748 826 A1 | 12/1996 | |
| JP | 2-308843 | 12/1990 | |
| JP | 8-259773 | 10/1996 | ........... C08L/51/06 |
| JP | 9-165490 | 6/1997 | ........... C08L/51/06 |
| JP | WO 97/22671 | 6/1997 | |
| JP | 10-120801 | 5/1998 | .............. C08J/5/18 |

OTHER PUBLICATIONS

Supplementary European Search Report for EP 98947839 dated Mar. 7, 2001.

* cited by examiner

*Primary Examiner*—Paul R. Michl
(74) *Attorney, Agent, or Firm*—Sughrue Mion, PLLC

(57) ABSTRACT

An aqueous-dispersing composition of synthetic resin (A) having an intrinsic viscosity "η" of from 0.3 to 2.0 measured at 35° C. in a methyl ethyl ketone solvent or a mixture of that aqueous dispersion and an aqueous dispersion of synthetic resin (B) having an intrinsic viscosity "η" of not less than 0.6 which is larger by 0.3 or more than the intrinsic viscosity "η" of the synthetic resin (A) when the intrinsic viscosity is measured at 35° C. in a methyl ethyl ketone solvent. The aqueous-dispersing composition and the mixture have improved film forming property and can give a coating film being excellent in chemical resistance, water resistance, mechanical properties and further hot water resistance.

10 Claims, No Drawings

US 6,359,030 B1

AQUEOUS RESIN DISPERSION COMPOSITION

TECHNICAL FIELD

The present invention relates to an aqueous-dispersing composition of composite resin being excellent in film forming property and giving a coating film having excellent chemical resistance, water resistance and mechanical properties and a mixture of aqueous dispersions containing the composite resin.

BACKGROUND ART

In the field of an emulsion paint, giving a good film forming property has been assumed to be contrary to obtaining a coating film having a high modulus of elasticity, and a method of sacrificing an anti-staining property by lowering a glass transition temperature Tg of a resin or a method of forming a film of resin emulsion having a high Tg by using a large amount of plasticizer has been employed. Further it is known that by reducing a molecular weight, an effect of the plasticizer is increased, but as a result, problems with lowering of water resistance and mechanical properties arise.

DISCLOSURE OF INVENTION

In view of the above-mentioned points, the present inventors have made intensive studies and have found that an aqueous-dispersing composition of composite resin which is prepared by seed-polymerizing a monomer in an aqueous medium in the presence of particles of a synthetic resin having a specific range of molecular weight has an excellent film forming property and can form a coating film excellent in chemical resistance, water resistance and mechanical properties and further that a mixture of the aqueous dispersion of composite resin and other aqueous dispersion of a specific synthetic resin can form a coating film excellent in hot water resistance. Thus the present invention was completed.

The present invention relates to an aqueous-dispersing composition of composite resin, which is an aqueous-dispersing composition of a composite resin (C) comprising a synthetic resin (A) of a monomer or monomers (a) and a synthetic resin (B) of a monomer or monomers (b) having different component or proportion from that of the monomer (s) (a); the composite resin (C) is prepared by seed-polymerizing the monomer(s) (b) in an aqueous medium in the presence of particles of the synthetic resin (A) and an intrinsic viscosity "η" of the synthetic resin (A) is from 0.3 to 2.0 (intrinsic viscosity measured at 35° C. in methyl ethyl ketone (MEK) solvent, hereinafter the same).

The present invention also relates to a mixture of the aqueous dispersion of the above-mentioned composite resin (C) and an aqueous dispersion of synthetic resin (D) having an intrinsic viscosity "η" of not less than 0.6 which is larger by 0.3 or more than the intrinsic viscosity "η" of the synthetic resin (A).

As the mixture of aqueous dispersions of resin, preferred is the mixture comprising an aqueous dispersion of fluorine-containing seed polymer (C1) obtained by seed-polymerizing a non-fluorine-containing monomer (b1) having a reactive α,β-unsaturated group in an aqueous medium in the presence of particles of a fluorine-containing polymer (A1) having an intrinsic viscosity "η" of from 0.3 to 2.0 and an aqueous dispersion of fluorine-containing seed polymer ((D1) obtained by seed-polymerizing a non-fluorine-containing monomer (g1) having a reactive α,β-unsaturated group in an aqueous medium in the presence of particles of a fluorine-containing polymer (E1) having an intrinsic viscosity "η" of not less than 0.6 which is larger by 0.3 or more than the intrinsic viscosity "η" of the fluorine-containing polymer (A1).

BEST MODE FOR CARRYING OUT THE INVENTION

The composite resin (C) of the present invention is a seed polymer of the synthetic resin (A) comprising the monomer (s) (a) and the synthetic resin (B) comprising the monomer (s) (b).

The synthetic resin (A) is not limited particularly and known synthetic resins are used, for example, a fluorine-containing polymer, acrylic resin, silicon-modified acrylic resin, urethane resin, melamine resin, silicone resin, epoxy resin, polyester, and the like. Among them, preferred is a fluorine-containing polymer from the viewpoint of weather resistance and chemical resistance.

The monomer (a) is not limited particularly. The monomer (a) may be one which can give the above-mentioned synthetic resin by polymerization.

When the synthetic resin (A) is the fluorine-containing polymer (A1), fluoroolefins having about 2 to 4 carbon atoms, for example, vinyl fluoride, vinylidene fluoride (VdF), tetrafluoroethylene (TFE), chlorotrifluoroethylene (CTFE), hexafluoropropylene (HFP), trifluoroethylene, and the like can be used.

Examples of the polymer (A1) of the above-mentioned fluoroolefin are, for instance, homopolymers of the above-mentioned fluoroolefins and known copolymers of two or more fluoroolefins. There are homopolymers of VdF, TFE and CTFE, VdF/TFE copolymer, VdF/HFP copolymer, VdF/CTFE copolymer, VdF/TFE/CTFE copolymer, VdF/TFE/HFP copolymer and TFE/HFP copolymer.

Aqueous dispersions of particles of those fluoroolefin polymers (A1) are prepared by usual emulsion polymerization. Namely the aqueous dispersions can be obtained by emulsion-polymerizing a fluoroolefin monomer or a mixture of fluoroolefin monomers in the presence of an emulsifying agent of not more than 5% by weight, preferably not more than 1% by weight on the basis of water.

It is preferable that water to be used in the emulsion polymerization is de-ionized water. Also it is preferable that the emulsifing agent is a fluorine-containing surfactant. Further a reactive fluorine-containing emulsifying agent can also be used. Also a slight amount of non-fluorine-containing nonionic emulsifying agent can be used together with the above-mentioned emulsifying agent.

The fluorine-containing emulsifying agent means a compound containing a fluorine atom in its structure and having a surface-activating ability or a mixture of two or more thereof. Examples of the compound are, for instance, an acid represented by $X(CF_2)_n COOH$, in which n is an integer of 6 to 20, X is F or H, its metal salt, ammonium salt, amine salt or quaternary ammonium salt; an acid represented by $Y(CH_2CF_2)_m COOH$, in which m is an integer of 6 to 13, Y is F or Cl, its metal salt, ammonium salt, amine salt or quaternary ammonium salt; and the like. In addition, it is possible to use a reactive emulsifying agent disclosed in JP-A-8-67795 solely or in combination with the above-mentioned fluorine-containing emulsifying agent. Also it is possible to use a non-fluorine-containing nonionic emulsifying agent disclosed in JP-A-7-90153 together.

Other examples of the fluoroolefin polymer (A1) are, for instance, copolymers of fluoroolefin and a non-fluorinecontaining monomer (excluding reactive non-fluorine-containing α,β-unsaturated monomers (b2) having functional group which are described hereinafter).

As the monomers being copolymerizable with the above-mentioned fluoroolefins, there are, for example, α-olefins such as ethylene, propylene and isobutylene; vinyl ethers such as ethyl vinyl ether (EVE), cyclohexyl vinyl ether (CHVE), hydroxybutyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, and VEOVA9 and VEOVA10 (brand names of Shell Chemical Co., Ltd.); ethylenically unsaturated carboxylic acids such as itaconic anhydride, succinic anhydride and crotonic acid; and the like. Particularly α-olefins, vinyl ethers, vinyl esters and alkenyls are used preferably.

Examples of the above-mentioned copolymers are TFE/propylene copolymer, TFE/ethylene copolymer, TFE/vinyl ester copolymer, TFE/vinyl ether copolymer, HFP/vinyl ether copolymer, HFP/vinyl ester copolymer, CTFE/vinyl ether copolymer, and the like. Further there are polymers comprising three or more monomers, which contain, in addition to the above-mentioned copolymer, a monomer copolymerizable with the above-mentioned fluoroolefin as a modified monomer in an amount of not more than 30% by mole.

The dispersions of particles of those fluoroolefin copolymers are prepared by usual emulsion polymerization. A process for emulsion polymerization may be the same as the process for polymerization of the fluoroolefin polymer of above (1) except that a mixture of a fluoroolefin and a monomer copolymerizable with the fluoroolefin is used.

It is preferable that the fluoroolefin monomer is contained in the copolymer of the mentioned fluoroolefin and non-fluorine-containing monomer in an amount of 20 to 80% by mole. When the content of the fluoroolefin monomer is less than 20% by mole, there is a tendency that weather resistance is not exhibited sufficiently, and when more than 80% by mole, there is a tendency that when a coating is made and a coating film is formed, appearance is lowered.

Examples of the synthetic resin (A) other than the fluorine-containing polymer (A1) are those disclosed in JP-A-8-259892, and the like.

For example, there are polymers prepared by using the following vinyl monomers.

Examples thereof are, for instance, vinyl monomers such as methyl (meth)acrylate, ethyl (meth)acrylate, butyl (meth)acrylate, isobutyl (meth)acrylate, benzyl (meth)acrylate and cyclohexyl (meth)acrylate; aromatic hydrocarbon type vinyl monomers such as styrene, α-methylstyrene, chlorostyrene, 4-hydroxystyrene and vinyltoluene; polymerizable acids having carbon-carbon double bond such as α,β-ethylenically unsaturated carboxylic acids e.g. acrylic acid, methacrylic acid, maleic acid, maleic anhydride, itaconic acid, itaconic anhydride, crotonic acid, fumaric acid and citraconic acid, styrenesulfonate, vinylsulfonate etc.; or salts thereof (alkali metal salt, ammonium salt, amine salt, and the like); acid anhydrides such as maleic anhydride or half esters of acid anhydride with a linear or branched alcohol having 1 to 20 carbon atoms; (meth)acrylates having an amino group such as dimethylaminoethyl (meth)acrylate, dimethylaminopropyl (meth)acrylate and diethylaminoethyl (meth)acrylate; (meth)acrylamide, α-ethyl (meth)acrylamide, N-buthoxymethyl (meth)acrylamide, N,N-dimethyl acrylamide, N-methyl acrylamide, acryloyl morpholine or hydrochloric acid salt or acetic acid salt thereof; vinyl esters such as vinyl acetate, vinyl propionate and diallyl phthalate and allyl compounds; vinyl monomers having a nitrile group such as (meth)acrylonitrile; vinyl monomers having an epoxy group such as glycidyl (meth)acrylate; hydroxyl-containing vinyl monomers such as 2-hydroxyethyl (meth)acrylate, 2-hydroxypropyl (meth)acrylate, 2-hydroxyethyl vinyl ether, N-methylol (meth)acrylamide, hydroxystyrene and hydroxyl-containing vinyl type modified hydroxyalkyl vinyl monomer; vinyl compounds such as hydroxyalkyl esters of α,β-ethylenically unsaturated carboxylic acid such as hydroxyalkyl ester of (meth)acrylic acid, vinyl compounds such as phosphate group containing vinyl compound, or (meth)acrylates having urethane bond or siloxane bond; and other vinyl monomers such as vinyl methyl ether, vinyl chloride, vinylidene chloride, chloroprene, propylene, butadiene and N-vinyl imidazole.

Also there can be used monomers which have a silyl group and are represented by the formula (I):

$$X_{3-a}SiR_a \qquad (I)$$

wherein X is an organic group having hydrolyzability, R is an organic group which has an ethylenically unsaturated bond, comprises hydrogen atom and carbon atom and may have oxygen atom, a is 1 or 2.

Examples thereof are, for instance, $CH_2=CHSi(OCH_3)_3$,

$CH_2=C(CH_3)Si(OCH_3)_3$,

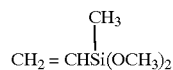

$CH_2=CHSi(OC_2H_6)_3$,
$CH_2=CHSi(OC_3H_7)_3$,
$CH_2=CHSi(OC_4H_9)_3$,
$CH_2=CHSi(OC_6H_{13})_3$,
$CH_2=CHSi(OC_8H_{17})_3$,
$CH_2=CHSi(OC_{10}H_{21})_3$,
$CH_2=CHSi(OC_{12}H_{25})_3$,
$CH_2=CHCOO(CH_2)_3Si(OCH_3)_3$,

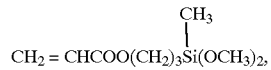

$CH_2=C(CH_3)COO(CH_2)_3Si(OCH_3)_3$,

$CH_2=CHCOO(CH_2)_3Si(OC_2H_5)_3$,

$CH_2=C(CH_3)COO(CH_2)_3Si(OC_2H_5)_3$,

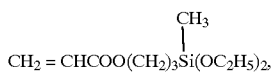

$CH_2=C(CH_3)COO(CH_2)_2O(CH_2)_3Si(OCH_3)_3$,

$CH_2=C(CH_3)COO(CH_2)_{11}Si(OCH_3)_3$,

$CH_2=CHCH_2OCO(ort\text{-}C_6H_4)COO(CH_2)_3Si(OCH_3)_3$,

$CH_2=CH(CH_2)_4Si(OCH_3)_3$,
$CH_2=CH(CH_2)_8Si(OCH_3)_3$,
$CH_2=CHO(CH_2)_3Si(OCH_3)_3$,
$CH_2=CHCH_2O(CH_2)_3Si(OCH_3)_3$,
$CH_2=CHCH_2OCO(CH_2)_{10}Si(OCH_3)_3$,
$CH_2=CH(p\text{-}C_6H_4)Si(OCH_3)_3$,

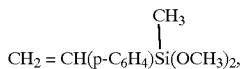

$CH_2=C(CH_3)(p\text{-}C_6H_4)Si(OCH_3)_3$,

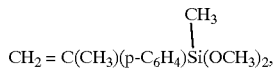

and the like. Among them, particularly vinyl monomers having alkoxysilyl group are preferred from the viewpoint of stability.

Those silyl group-containing vinyl monomers may be used solely or in a mixture of two or more thereof. It is preferable that those monomers are copolymerized in an amount of 1 to 50% by weight, further preferably 2 to 30% by weight. When the amount is less than 1% by weight, water resistance and weather resistance are poor, and when more than 50% by weight, stability of emulsion is lowered and storage stability is lowered.

In order to obtain a resin having urethane bond, the urethane bond is introduced into a copolymer by reacting an isocyanate compound with a hydroxyl-containing monomer. In order to obtain a crosslinked resin with urethane bond, a vinyl polymer having free isocyanate group and/or block isocyanate group may be mixed and reacted with a vinyl polymer having hydroxyl group, and thus crosslinking with urethane is carried out. The isocyanate compounds are those having two isocyanate groups in a molecule thereof, for example, aliphatic, aromatic and alicyclic diisocyanate compounds such as tolylene diisocyanate, 4,4'-diphenylmethane diisocyanate, xylene diisocyanate, hexamethylene diisocyanate, lysine diisocyanate, 4,4'-methylenebis(cyclohexyl isocyanate), mthylcyclohexane-2,4(2,6)-diisocyanate, isophorone diisocyanate and trimethylhexane diisocyanate and reaction products of those isocyanate compounds with a polyether resin, polyester resin or polycarbonate resin which has two or more hydroxyl groups in its molecule. The isocyanate-containing monomer may be prepared by reacting the above-mentioned diisocyanate compounds with the mentioned hydroxyl-containing monomer. For example, preferred are adducts of isophorone diisocyanate with 2-isocyanate ethyl methacrylate, m-isopropenyl-α,α'-dimethyl benzyl isocyanate or 2-hydroxyethyl methacrylate in equimolar amounts.

Examples of the vinyl monomer having a carbonyl group are, for instance, acrolein, diacetone acrylamide, formylstyrol, preferably vinyl alkyl ketone having 4 to 7 carbon atoms (for example, vinyl methyl ketone, vinyl ethyl ketone, vinyl isobutyl ketone, and the like), diacetone acrylate, acetonyl acrylate, diacetone methacrylate, 2-hydroxypropyl acrylate-acetylacetate, butanediol-1,4-acrylate-acetylacetate, and the like. Those carbonyl-containing vinyl monomers may be used solely or in a mixture of two or more thereof. An amount of the carbonyl-containing vinyl monomer is from 0.1 to 30 parts by weight, preferably from 3 to 10 parts by weight on the basis of the whole monomers.

As a compound having hydrazine or hydrazyl group which is reacted with the carbonyl-containing polymer, preferred are hydrazine derivatives having at least two hydrazine residues in a molecule thereof. Examples thereof are dihydrazide dicarbonates which are dehydrated condensates of hydrazine and dicarboxylic acids having 2 to 10, preferably 4 to 6 carbon atoms (for example, dihydrazide oxalate, dihydrazide malonate, dihydrazide succinate, dihydrazide glutamate, dihydrazide adipate, dihydrazide sebacate, dihydrazide maleate, dihydrazide fumarate, dihydrazide itaconate, and the like); and water soluble aliphatic dihydrazines having 2 to 4 carbon atoms (for example, ethylene-1,2-dihydrazine, propylene-1,3-dihydazine, butylene-1,4-dihydrazine, and the like).

The aqueous dispersion of the synthetic resin (A) can be usually prepared by an emulsion polymerization method, in which the monomer(s) (a) is polymerized in an aqueous medium in the presence of an emulsifying agent; a suspension polymerization method, in which the monomer(s) (a) is polymerized in an aqueous medium in the presence of a dispersion stabilizing agent; or a phase-change method, in which the polymer obtained by polymerizing the monomer (s) in an organic solvent is changed to aqueous phase and dispersed in water. Among them, emulsion polymerization method is preferably adopted from the viewpoint of stability of dispersion.

The aqueous-dispersing composition of composite resin of the present invention is prepared by seed-polymerizing the monomer(s) (b) in the aqueous dispersion of the synthetic resin (A) particles to obtain the composite of the synthetic resin (A) and the synthetic resin (B) derived from the monomer(s) (b).

With respect to the particle size of the synthetic resin (A), it is desirable that an average particle size thereof is from 50 to 300 μm, preferably from 100 to 200 μm from the viewpoint of sedimentation stability and viscosity of the aqueous dispersion. A solid content of the dispersion is usually from about 20% by weight to about 60% by weight.

Examples of the synthetic resin (B) formed by the seed polymerization are non-fluorine-containing synthetic resins excluding the fluorine-containing polymer (A1) among the synthetic resins exemplified in the synthetic resin (A). Particularly an acrylic resin and silicon-modified acrylic resin are preferred.

A preferred monomer (b) for the synthetic resin (B) is a non-fluorine-containing monomer (b1) having a reactive α,β-unsaturated group. Examples of the non-fluorine-containing monomer (b1) having reactive α,β-unsaturated group are, for instance, reactive non- luorine-containing α,β-unsaturated monomers (b2) having functional group such as an acrylic monomer and silyl-containing vinyl monomer represented by the above-mentioned formula (I).

Examples of the acrylic monomer are reactive α,β-unsaturated monomers such as alkyl acrylates having an alkyl group of C1 to C18 and alkyl methacrylates having an alkyl group of C1 to C18 and monomers being copolymerizable therewith and having ethylenically unsaturated unit.

Examples of the alkyl acrylates having an alkyl group of C1 to C18 are, for instance, methyl acrylate, ethyl acrylate, propyl acrylate, n-butyl acrylate, isobutyl acrylate, 2-ethylhexyl acrylate, lauryl acrylate, and the like.

Examples of the alkyl methacrylates having an alkyl group of C1 to C18 are, for instance, methyl methacrylate, ethyl methacrylate, propyl methacrylate, n-propyl methacrylate, isobutyl methacrylate, cyclohexyl methacrylate, lauryl methacrylate, and the like.

Also for the purpose to enhance solvent resistance and water resistance, it is possible to copolymerize a polyfunctional monomer such as ethylene glycol dimethacrylate or propylene glycol dimethacrylate.

Examples of the monomer having an ethylenically unsaturated unit and being copolymerizable with the acrylic ester and/or methacrylic ester are, for instance, α-olefins such as ethylene, propylene and isobutylene; vinyl ethers such as ethyl vinyl ether (EVE), cyclohexyl vinyl ether (CHVE), hydroxy butyl vinyl ether (HBVE), butyl vinyl ether, isobutyl vinyl ether, methyl vinyl ether and polyoxyethylene vinyl ether; alkenyls such as polyoxyethylene allyl ether, ethyl allyl ether, hydroxyethyl allyl ether, allyl alcohol and allyl ether; vinyl esters such as vinyl acetate, vinyl lactate, vinyl butyrate, vinyl pivalate, vinyl benzoate, and VEOVA9 and VEOVA10 (brand names available from Shell Chemical Co., Ltd.); ethylenically unsaturated carboxylic acids such as itaconic anhydride, succinic anhydride and crotonic acid; aromatic vinyl compounds such as styrene, a-methylstyrene and p-tert-butylstyrene; acrylonitrile; and the like.

Examples of the non-fluorine-containing monomer (b2) for the silicon-modified acrylic resin are mixtures of monomers represented by the formula (I) as the monomer(s) (a) for the synthetic resin (A). Particularly preferred are those containing γ-methacryloyloxytrimethoxysilane, γ-methacryloyloxymethyldimethoxysilane, γ-methacryloyloxytriethoxysilane or γ-methacryloyloxymethyldiethoxysilane.

As a preferred composite resin (C), there is a fluorine-containing seed polymer (C1) prepared by seed-polymerizing a non-fluorine-containing monomer (b1) having a reactive α,β-unsaturated group, particularly a non-fluorine-containing reactive α,β-unsaturated monomer (b2) having functional group with the fluorine-containing polymer (A1).

In the present invention, it is preferable that a content of the fluorine-containing polymer (A1) is from 20 to 90% by mole on the basis of the whole composite resin (C). When the content of the fluorine-containing polymer (A1) is less than 20% by mole, there is a tendency that weather resistance is not exhibited sufficiently, and when more than 90% by mole, at the time of making a coating and forming a coating film, its appearance tends to be lowered.

The seed polymerization of the monomer(s) (b) can be carried out under the same conditions as in usual emulsion polymerization. For example, into a water medium containing particles of the synthetic resin (A) are added a surfactant, a polymerization initiator, a chain transfer agent and as case demands, a chelating agent, a pH control agent, a solvent, etc. and then polymerization reaction of the monomer(s) (b) is conducted at about 20° C. to about 80° C. for about 0.5 hour to about 6 hours.

When the monomer(s) (b) is emulsion-polymerized in the presence of particles of the synthetic resin (A), it seems that at first, there occurs swelling of the particles of the synthetic resin (A) with the monomer(s) (b) and at that time, the mixture becomes in the state of an aqueous dispersion of the synthetic resin (A) dissolved uniformly in the monomer(s) (b), and then the monomer(s) (b) is polymerized by adding an initiator, to form the synthetic resin (B), thus forming single phase polymer blend particles, in which the molecular chains of the synthetic resins (A) and (B) are entangled with each other.

As a surfactant, there is used an anionic surfactant, nonionic surfactant or combination of the anionic and nonionic surfactants, and as case demands, an amphoteric surfactant can be used.

Examples of the anionic surfactant are a sulfate of higher alcohol, sodium alkylsulfonate, sodium alkylbenzenesulfonate, sodium dialkylsulfosuccinate, sodium alkyldiphenylether disulfonate, and the like. Examples of the nonionic surfactant are polyoxyethylene alkyl ethers, polyoxyethylene alkyl phenyl ethers, polyoxyethylene alkyl esters, polyoxyethylene alkyl phenyl esters, sorbitan alkyl esters, glycerol esters, their derivatives, and the like.

As the amphoteric surfactant, there are lauryl betaine, and the like. Further a so-called reactive emulsifying agent which is copolymerizable with the ethylenically unsaturated monomer can be used.

Examples of commercially available reactive emulsifying agent are Blemmar PE-350, Blemmar PME-400 and Blemmar 70PEP350B (available from NOF Corporation); NK Ester M-40G, NK Ester M-90G and NK Ester M-230G (available from Shin-Nakamura Kagaku Kabushiki Kaisha); RMA450M (available from Nippon Nyukazai Kabushiki Kaisha); Aquaron HS10, Aquaron HS20, Aquaron HS1025, Aquaron RN10, Aquaron RN20, Aquaron RN30, Aquaron RN50 and Aquaron RN2025 (available from Dai-ichi Kogyo Seiyaku Kabushiki Kaisha); NK Ester AMP-60G, NK Ester CB-1, NK Ester SA and NK Ester A-SA; Eleminol JS2 and Eleminol RS30 (available from Sanyo Kasei Kogyo Kabushiki Kaisha); Latemle WX (available from Kao Corporation); and the like.

An amount of the surfactant is usually from about 0.05 part by weight to about 5.0 parts by weight on the basis of 100 parts by weight of the ethylenically unsaturated monomer.

The initiator is not particularly limited as far as a radical which can be used for free radical polymerization in aqueous medium is produced at 20° to 90° C. As case demands, the initiator can be used in combination with a reducing agent. Examples of the water-soluble initiator are, for instance, a persulfate, hydrogen peroxide, 2,2-azobis(2- amidinopropane) hydrochloride (AIBA) and the like, and examples of the reducing agent are sodium pyrosulfite, sodium hydrogensulfite, sodium L-ascorbate, and the like. Examples of oil-soluble initiator are diisopropylperoxydicarbonate (IPP), benzoyl peroxide, dibutyl peroxide, azobisisobutyronitrile (AIBN), and the like. An amount of the initiator is usually from about 0.05 part by weight to about 2.0 parts by weight on the basis of 100 parts by weight of the ethylenically unsaturated monomer.

A polymerization temperature may be from 20° to 90° C.

Examples of the chain transfer agent are a halogenated hydrocarbon (for example, chloroform, carbon tetrachloride, or the like), mercaptans (for example, n-lauryl mercaptan, t-lauryl mercaptan, or n-octyl mercaptan) and the like. An amount of the chain transfer agent is usually from 0 to about 5.0 parts by weight on the basis of 100 parts by weight of the ethylenically unsaturated monomer.

As the solvent, there may be used methyl ethyl ketone, acetone, trichlorotrifluoroethane, methyl isobutyl ketone, cyclohexanone, ethyl acetate, or the like in such a small amount as not lowering workability, safety against disaster, safety in environment and safety in production. By adding the solvent, there is a case where swelling property of the monomer (b) into the particles of the synthetic resin (A) for seed polymerization is improved.

The seed polymerization can be carried out by known method, for example, a method of charging the whole amount of monomer(s) (b) in one lot in a reaction system in the presence of the particles of the synthetic resin (A), a method of charging a part of the monomer(s) (b) for the reaction and then charging the remaining monomer continuously or dividedly or a method of charging the whole amount of monomer (b) continuously.

An essential feature of the present invention is to use the synthetic resin (A) having an intrinsic viscosity "$\eta$" of from 0.3 to 2.0. By adjusting the intrinsic viscosity "$\eta$" of the synthetic resin (A) to 0.3 to 2.0, a film forming property of the composite resin (C) can be improved, and water resistance and mechanical properties such as mechanical strength and elongation of the obtained coating film can be enhanced. Particularly preferable "$\eta$" is from 0.5 to 1.2. The intrinsic viscosity "$\eta$" can be adjusted, for example, by an amount of a molecular weight control agent, polymerization temperature, yield, etc.

In this specification the intrinsic viscosity "$\eta$" is a value measured at 35° C. in methyl ethyl ketone (MEK).

From the viewpoint of water resistance and film forming property, it is preferable that the weight average molecular weight Mw of the synthetic resin (B) formed by the seed polymerization is not less than is 10,000, particularly from 10,000 to 1,000,000.

The molecular weight of the synthetic resin may be adjusted optionally, for example, by an amount of a molecular weight control agent, polymerization temperature, yield, etc.

It is preferable that in the so-obtained composite resin (C), a content of the resin (B) is from 5 to 2,000 parts by weight, particularly from 30 to 1,000 parts by weight on the basis of 100 parts by weight of the resin (A) from the viewpoint of mechanical properties and film forming property.

A concentration of particles of the composite resin in the aqueous-dispersing composition of composite resin of the present invention is not particularly limited, and may be optionally adjusted in a range of from 0.5 to 70% by weight, preferably from 10 to 60% by weight depending on application.

The present invention also relates to the mixture of the queous dispersion of the composite resin (C) having an intrinsic iscosity "$\eta$" of from 0.3 to 2.0 and the aqueous dispersion of the synthetic resin (D) having an intrinsic viscosity "$\eta$" of not less than 0.6 which is larger by 0.3 or more than the intrinsic viscosity "$\eta$" of the synthetic resin (A). It is preferable that both of the composite resin (C) and synthetic resin (D) are fluorine-containing polymers.

The composite resin (C) and synthetic resin (D) of the present invention may be of same kind or different kinds except that the intrinsic viscosity "$\eta$" is different from each other.

The synthetic resin (D) is not particularly limited, and known synthetic resins can be used as far as the above-mentioned requirements for "$\eta$" are satisfied. Example thereof is a synthetic resin ((D1) comprising the same components as the synthetic resin (A) used for preparing the composite resin (C) and having an intrinsic viscosity "$\eta$" of not less than 0.6 which is larger by 0.3 or more than the intrinsic viscosity "$\eta$" of the synthetic resin (A) or a composite resin (D2) prepared by seed-polymerizing a non-fluorine-containing monomer (g) in the same manner as in the composite resin (C) except that the synthetic resin ((D1) is used as a seed.

The synthetic resin (D1) is not particularly limited, and known synthetic resins can be used. Examples thereof are, for instance, a fluorine-containing polymer, acrylic resin, silicon-modified acrylic resin, urethane resin, melamine resin, silicone resin, epoxy resin, polyester, etc. like the synthetic resin (A) used for the composite resin (C). Also examples of monomers thereof are those raised in the synthetic resin (A). Among them, a fluorine-containing polymer is preferred from the viewpoint of weather resistance and chemical resistance. From the point of stain-proofing property, a silicon-modified acrylic resin is preferred.

With respect to the composite resin (D2), as mentioned above, the monomers and polymerization method which are used for preparation of the composite resin (C) can be employed except that the synthetic resin having an intrinsic viscosity "$\eta$" of not less than 0.6 which is larger by 0.3 or more than the intrinsic viscosity "$\eta$" of the synthetic resin (A) is used as the synthetic resin (D1) which are seed particles for the seed polymerization.

With respect to a combination of the composite resin (C) and synthetic resin (D), preferred are a combination of a fluorine-containing seed polymer (C1) as the resin (C) and the same or different kind of fluorine-containing seed polymer (E1) as the resin (D), a combination of a fluorine-containing seed polymer (C1) as the resin (C) and an acrylic resin as the resin (D), a combination of a fluorine-containing seed polymer (C1) as the resin (C) and a silicon-modified acrylic resin as the resin (D), a combination of silicon-modified acrylic resins as both of (C) and (D), etc. Particularly from the point of enhancing weather resistance, chemical resistance and water resistance of a coating film, preferred is the combination of a fluorine-containing seed polymer (C1) as the resin (C) and the same or different kind of fluorine-containing seed polymer (E1) as the resin (D).

Examples of the combination of fluorine-containing seed polymers are, for instance, the combination that the (C1) and (F1) are the same kind of VdF copolymers, or the combination that the (C1) and (F1) are copolymers comprising the same kind of fluoroolefin and vinyl ether or vinyl ester. From the viewpoint of compatibility at blending, it is particularly preferable that both of (C1) and (F1) are fluorine-containing seed polymers prepared by seed-polymerizing a non-fluorine-containing monomer (g) having $\alpha,\beta$-unsaturated group in the presence of particles of VdF copolymers.

An essential feature of the present invention is to use in the composite resin (C), the synthetic resin (A) having an intrinsic viscosity of 0.3 to 2.0 and on the other hand to use the synthetic resin (D) having an intrinsic viscosity "η" of not less than 0.6 which is larger by 0.3 or more than the intrinsic viscosity "η" of the synthetic resin (A).

Such a combination of the intrinsic viscosity "η" has a meaning mentioned below.

Namely in general in a coating composition for emulsion paint, as an intrinsic viscosity of a synthetic resin increases, mechanical properties such as mechanical strength and elongation and water resistance are enhanced, but on the contrary, film forming property, internal stress relaxation ability of the coating film, etc. are lowered. Even if resins having different intrinsic viscosities "η" are mixed without any theories or indices, it only compensates for deficiencies each other.

The present invention was completed based on newly known facts that when an intrinsic viscosity "η" of the synthetic resin (A) in the composite resin (C) is from 0.3 to 2.0, preferably from 0.5 to 1.2 and the synthetic resin (D) having an intrinsic viscosity "η" of not less than 0.6, preferably not less than 1.0 which is larger by 0.3 or more than the intrinsic viscosity "η" of the synthetic resin (A) is used and further when the both of the composite resin (A) and synthetic resin (D) are mixed in the form of an aqueous dispersion, not only the above-mentioned deficiencies of each resin are compensated for but also useful characteristics of each resin, i.e. mechanical properties such as mechanical strength and elongation, film forming property and ability of reducing stress inside a coating film are not lost.

When the intrinsic viscosity "η" of the synthetic resin (A) in the composite resin (C) is less than 0.3, water resistance and mechanical properties of the obtained coating film are lowered, and when more than 2.0, an effect on improvement in film forming property is not recognized. When a difference between the intrinsic viscosities of the synthetic resins (D) and (A) is less than 0.3, an effect on improvement in water resistance and mechanical properties is not obtained.

This new synergetic effect is explained below as an example in case where the both of the composite resin (C) and synthetic resin (D) are VdF composite resins (VdF composite resin means a resin obtained by subjecting a VdF copolymer to seed-polymerization). Even if the other resins are used as the composite resin (C) and synthetic resin (D), the above-mentioned synergetic effect is exhibited substantially.

In the VdF composite resins, when an intrinsic viscosity "η" of VdF copolymer is from 0.3 to 2.0, a film forming property is excellent but hot water resistance is not enough in case of a single use of the VdF copolymer. On the other hand, the VdF copolymer of (D) is excellent in mechanical properties and hot water resistance but poor in film forming property as compared with the resin (C). By using a mixture of those (C) and (D), not only disadvantages of the both resins are eliminated but also a composition having well balanced hot water resistance, mechanical properties and film forming property is obtained and further characteristics such as water permeability which could not be obtained by a single use of each resin are exhibited.

As mentioned above, in the present invention, both the resins (C) and (D) are mixed in the form of aqueous dispersion of particles thereof. It is preferable that an average particle size of particles in the aqueous dispersion is, for example, from 50 to 300 nm, particularly from 100 to 200 nm from the viewpoint of stability and viscosity of the dispersion. A particle size of the resins (C) and (D) may be in the same range or in a different range, and is not limited particularly. Contents of the resins (C) and (D) may be the same or different, and are optionally selected in the range of from 20 to 70% by weight, preferably from 30 to 60% by weight depending on kinds of the resins.

A proportion of the composite resin (C) and the synthetic resin (D) varies depending on a property to be aimed such as a mechanical property, water resistance or film forming property, and is optionally selected. When an amount of the synthetic resin (D) is too small, mechanical properties and water resistance are not improved and when the amount is too much, film forming property is lowered. Usually an amount of the synthetic resin (D) is from 5 to 2,000 parts by weight on the basis of 100 parts by weight of the composite resin (C).

The aqueous dispersion of the synthetic resin (D) can be usually prepared by an emulsion polymerization method, in which a monomer is polymerized in an aqueous medium in the presence of an emulsifying agent, a suspension polymerization method, in which a monomer is polymerized in an aqueous medium in the presence of a dispersion stabilizing agent, a phase conversion method, in which a polymer obtained by polymerizing a monomer in an organic solvent is phase-converted and dispersed in water. Among them, emulsion polymerization method is preferably adopted from the viewpoint of stability of dispersion.

An intrinsic viscosity "η" of the synthetic resin (D) can be adjusted, for example, by an amount of a molecular weight control agent, polymerization temperature, yield, etc.

The present invention also relates to the mixture of the aqueous dispersions of fluorine-containing resin comprising the above-mentioned aqueous dispersion of fluorine-containing seed polymer (C1) obtained by seed-polymerizing the non-fluorine-containing monomer (b1) having a reactive α,β-unsaturated group in an aqueous dispersion in the presence of particles of the fluorine-containing polymer (A1) having an intrinsic viscosity "η" of from 0.3 to 2.0, preferably from 0.5 to 1.2 and the aqueous dispersion of fluorine-containing seed polymer (E1) obtained by seed-polymerizing the non-fluorine-containing monomer (g1) having a reactive α,β-unsaturated group in an aqueous medium in the presence of particles of the fluorine-containing polymer (F1) having an intrinsic viscosity "η" of not less than 0.6 which is larger than the intrinsic viscosity "η" of the fluorine-containing polymer (A1) by 0.3 or more, preferably 0.5 or more.

Examples of the fluorine-containing polymer (F1) are fluorine-containing polymers raised as the examples with respect to the synthetic resin (A).

As the non-fluorine-containing monomer (g) to be seed-polymerized to the fluorine-containing polymer (F1), preferred is a reactive non-fluorine-containing α,β-unsaturated monomer (g1). Particularly preferred is a reactive non-fluorine-containing α,β-unsaturated monomer (g2) having functional group such as a non-fluorine-containing acrylic monomer or non-fluorine-containing acrylsilicone monomer.

The non-fluorine-containing monomer (g) to be seed-polymerized to the fluorine-containing polymer (F1) may be the same as or different from the non-fluorine-containing monomer (b) to be seed-polymerized to the fluorine-containing polymer (A1). Those exemplified as the non-fluorine-containing monomer (b) can be used.

It is preferable that the non-fluorine-containing monomer (g) is contained in the obtained fluorine-containing seed polymer (E1) in an amount of from 0.1 to 20% by weight, particularly from 1 to 10% by weight. When a content of the non-fluorine-containing monomer is decreased, an effect on improvement in stain-proofing property and stain removable property tends to be lowered, and when the content is increased, appearance of a coating film tends to be poor. It is preferable that a weight average molecular weight of the seed polymer obtained by seed-polymerizing the non-fluorine-containing monomer is not less than 10,000, preferably from 10,000 to 1,000,000.

In the mixture of the present invention, it is preferable that a content of a fluoroolefin monomer of the fluorine-containing seed polymer (C1) or (E1) is from 20 to 90% by mole. When the content of a fluoroolefin monomer is less than 20% by mole, there is a tendency that weather resistance is not exhibited sufficiently, and when more than 90% by mole, at the time of making a coating and forming a coating film, its appearance tends to be lowered.

The seed polymerization of the non-fluorine-containing monomer (g) to the fluorine-containing polymer (F1) can be carried out under the same conditions as in the emulsion polymerization of the composite resin (C). For example, a surfactant, a polymerization initiator, a chain transfer agent and as case demands, a chelating agent, a pH control agent and a solvent are added to water medium containing particles of the fluorine-containing polymer (F1), and a reaction for polymerization of the monomer(s) (b) is carried out at about 20° C. to about 90° C. for about 0.5 hour to about 6 hours. Also the non-fluorine-containing monomer can be seed-polymerized in an aqueous dispersion in which the fluorine-containing polymers (A1) and (F1) coexist. In that case, the aqueous dispersion produced by the seed polymerization becomes the mixture of the aqueous dispersions of the present invention.

An important feature of the present invention is to use the fluorine-containing polymer (A1) having an intrinsic viscosity "$\eta$" of from 0.3 to 2.0 and the fluorine-containing polymer (F1) having an intrinsic viscosity "$\eta$" of not less than 0.6 which is larger by 0.3 or more than the intrinsic viscosity "$\eta$" of the resin (A1). By adjusting the intrinsic viscosity "$\eta$" of the fluorine-containing polymer (A1) to 0.3 to 2.0, film forming property of the fluorine-containing seed polymer can be improved, and by adjusting the intrinsic viscosity "$\eta$" of the fluorine-containing polymer (F1) to not less than 0.6 and more than the intrinsic viscosity "$\eta$" of the resin (A1) by 0.3 or more, water resistance and mechanical properties such as mechanical strength and elongation of a coating film can be enhanced.

The mixture of the aqueous dispersions of the fluorine-containing resin of the present invention can be obtained by mixing the aqueous dispersion of fluorine-containing seed polymer (C1) and the aqueous dispersion of fluorine-containing seed polymer (E1). The mixing can be carried out by usual method, for example, by blending in the form of emulsion.

A proportion of the seed polymers (C1) and (E1) varies depending on a propert to be aimed such as mechanical properties, water resistance or film forming property, and is optionally selected. Usually an amount of the seed polymer (E1) is from 5 to 2,000 parts by weight, particularly from 30 to 1,000 parts by weight on the basis of 100 parts by weight of the seed polymer (C 1).

A total amount of the synthetic resin particles or seed polymer particles in the mixture of aqueous dispersions of the present invention is not particularly limited and may be optionally adjusted in the range of from 0.5 to 70% by weight, preferably from 10 to 60% by weight depending on application.

Even if an aqueous dispersion of a synthetic resin which is not combined with other resin (not seed-polymerized) and has an intrinsic viscosity "$\eta$" of from 0.3 to 2.0 is used instead of the aqueous dispersion of the composite resin (C) in the mixture of aqueous dispersions of resin, the same effect can be obtained. Examples of such a synthetic resin are those exemplified above as the synthetic resin (A).

The aqueous-dispersing composition of composite resin and the mixture of aqueous dispersions of resin of the present invention can be used in the form of aqueous coating as a surface preventive coating for an inorganic substrate such as concrete, slate or ALC plate and a metallic substrate and further as a coating for coated paper by adding additives such as a pigment, thickener, dispersing agent, anti-foaming gent, anti-freezing agent, film forming aid, ultraviolet ray absorbing agent and antioxidant which are generally used for aqueous emulsion paints. Also the aqueous-dispersing composition and the mixture of aqueous dispersions can be used as a coating for patterning by adding thereto natural stone, synthetic resin beads, etc. for flatting.

Further the aqueous-dispersing composition and the mixture of aqueous dispersions can be used as an aqueous paint for exterior and/or interior of medium- and low-storied building.

For application as a paint, a solid content of the aqueous-dispersing composition of resin of the present invention may be adjusted so as to be from about 5% by weight to about 95% by weight, usually from 20 to 90% by weight on the basis of the paint though it varies depending on a form of paint, coating method, etc.

For application of such an aqueous paint, known application method can be employed. In the application, known coating apparatuses such as brush, roller, roll coater, air sprayer, airless sprayer, electrostatic coating machine, dip coater and electrocoating machine can be used.

The above-mentioned aqueous paint can be applied to various substrates, i.e. not only metals such as iron, aluminum, copper and alloys thereof but also inorganic materials such as glass, cement and concrete, resins such as FRP, acrylic resin, vinyl chloride resin, polycarbonate resin and polyurethane resin, wood and fiber. Also if necessary, a substrate may be subjected to pre-coating or surface treating of an under coating such as a known aqueous resin emulsion coating or solvent type coating. The coating composition can be applied after optionally carrying out under-coating or pre-coating. The coating system can be applied as a clear coating or enamel coating on various known substrates having uneven surface patterns or color patterns. After the application, a coating film is usually dried for curing at 5° to 300° C. for 30 seconds to one week. A coating thickness is not particularly limited, and is usually from about 1 $\mu$m to about 200 $\mu$m, preferably from 5 to 100 $\mu$m, more preferably from 10 to 50 $\mu$m.

Since the so-obtained coated article is excellent in adhesion, weather resistance and chemical resistance and a surface of the coating film has a gloss, lubricity and hardness, the article can be used in a wide range of applications. Namely there are wide applications for coating of interior and exterior of electric appliances (electronic range, toaster, refrigerator, washing machine, hair dryer, television set, videocassette recorder, amplifier, radio, electric pot, rice cooker, radio with cassette recorder, cassette deck, compact disk player, video camera, etc.); interior and exterior of air conditioner such as indoor unit, outdoor unit, louver, duct, air cleaner and heater); illumination apparatuses such as fluorescent lamp, chandelier and reflection plate; furniture; machine parts; decorations; comb; frame of glasses; natural fiber; synthetic fiber (in the form of yarn or woven fabric obtained therefrom); interior and exterior of office machine (phone, facsimile machine, copying machine (including rollers), camera, overhead projector, prototype projector, clock, slide projector, desk, bookshelf, locker, shelf for documents, chair, bookends and electronic whiteboard); car-related parts (wheel, door mirror, lace, door handle, number plate, handle and instrument panel); cooking utensils (range hood, sink, cooking panel, cooking knife, chopping board, water tap, gas range and ventilator); for indoor coating of partition plate, bath unit, shutter, blind, curtain rail, accordion curtain, wall, ceiling and floor; and for outdoor coating of housing such as wall, handrail, door and shutter, and for outdoor coating of building such as sizing material of ceramic, foamed concrete panel, concrete panel, aluminum curtain wall, steel plate, galvanized steel plate, stainless steel plate, vinyl chloride sheet and window glass; and the like.

The present invention is then explained by means of preparation examples and examples, but is not limited to them.

[Aqueous-dispersing Composition of Composite Resin]

PREPARATION EXAMPLE 1
(Synthesis of Synthetic Resin (A))

A 1-liter pressure resistant reaction vessel provided with a stirrer was charged with 500 ml of deionized water, 0.5 g of ammonium perfluorooctanate and 0.05 g of polyoxyethylene monostearate (POE40). After repeating introduction of nitrogen under pressure and deaeration and then removing dissolved oxygen, a pressure was applied at 60° C. up to 10 kgf/cm² with a monomer mixture of VdF/TFE/ CTFE having a ratio in % by mole of 74/14/12. Then 20 g of a 1% aqueous solution of ammonium persulfate and 2.5 g of ethyl acetate were added and the monomer mixture of VdF/TFE/ CTFE having a ratio in % by mole of 74/14/12 was supplied continuously so that the inside pressure of the vessel was maintained constant at 10 kgf/cm². The reaction was continued and 5 g of a 1% aqueous solution of ammonium persulfate was added every 12 hours. Thus the reaction was carried out for 52 hours. Then the temperature and pressure inside the vessel were returned to normal to give an aqueous dispersion of fluorine-containing polymer. With respect to the obtained aqueous dispersion, measurements were carried out as follows.

Solid content: The aqueous dispersion was dried at 150° C. for one hour in a vacuum dryer. The solid content is shown by a percentage of a weight after the drying to a weight of the aqueous dispersion before the drying.

Average particle size: Measurement was carried out with a laser beam scattering particle size meter (DLS-3000 available from Otsuka Denshi) The results are such that the solid content was 34% and the average particle size was 131 nm.

[η]: The obtained aqueous dispersion was frozen, coagulated, washed and dried, then was prepared into a 0.5 w/v % MEK solution at 35° C. An intrinsic viscosity [η] of the MEK solution was measured at 35° C. by a four-point method by using Ubbelohde's viscometer of 89 seconds of MEK flow time at 35° C.

An intrinsic viscosity [η] of the resin was 0.34.

PREPARATION EXAMPLES 2 TO 5

Aqueous dispersions of Preparation Examples 2 to 5 were prepared in the same manner as in Preparation Example 1 except that an adding amount of ethyl acetate and polymerization time. were changed to those shown in Table 1. Characteristics of the aqueous dispersions are shown in Table 1.

TABLE 1

| Preparation Example No. | 1 | 2 | 3 | 4 | 5 |
|---|---|---|---|---|---|
| VdF (% by mole) | 74 | 74 | 74 | 74 | 74 |
| TFE (% by mole) | 14 | 14 | 14 | 14 | 14 |
| CTFE (% by mole) | 12 | 12 | 12 | 12 | 12 |
| Ethyl acetate (% by weight) | 0.5 | 0.3 | 0.15 | 0.5 | 0.05 |
| Polymerization time (hr) | 52 | 41 | 32 | 46 | 28 |
| Intrinsic viscosity [η] | 0.34 | 0.97 | 1.82 | 0.26 | 2.11 |
| Average particle size (nm) | 131 | 134 | 138 | 123 | 132 |
| Solid content (% by weight) | 34 | 42 | 42 | 28 | 43 |

EXAMPLE 1
(Synthesis of Aqueous Dispersion of Composite Resin)

A 1-liter four neck flask provided with a stirrer, cooling tube and thermometer was charged with the aqueous dispersion obtained in Preparation Example 1 and having a solid content of the fluorine-containing polymer in an amount of 100 g, and thereto was added 3.0 g of an aqueous solution of alkali salt of alkyl allyl sulfosuccinate (brand name ELEMINOL JS2 available from Sanyo Kasei Kogyo Kabushiki Kaisha, solid content: 38%). The mixture was heated with stirring in a water bath, and at the time when the bath temperature reached 80° C., to the mixture was added dropwise over one hour an emulsion prepared by emulsifying a monomer mixture comprising 60 g of methyl methacrylate (MMA), 7.0 g of butyl acrylate (BA) and 2.0 g of acrylic acid (AAc) with a 0.5% aqueous solution of alkali salt of alkyl allyl sulfosuccinate. Further 2.2 g of a 50% aqueous solution of polyoxyethylene methacrylate (brand name RMA450M available from Nippon Nyukazai Kabushiki Kaisha) was added and immediately after that, 1 ml of a 2% aqueous solution of ammonium persulfate was added to initiate a reaction. Three hours after initiation of the reaction, the temperature inside the bath was elevated to 85° C. and maintained for one hour. Then after water was removed under reduced pressure to concentrate, the mixture was cooled. After adjusting pH to 7 and a solid content to 50% with ammonia water, filtration was carried out with a metal net of 300 mesh to give a bluish white aqueous dispersion of fluorine-containing seed polymer. With respect to the aqueous dispersion, an average particle size and a molecular weight of seed-polymerized acryl portion were measured. The results are shown in Table 2.

Molecular weight of acryl portion: The obtained aqueous dispersion was dried and was prepared into a 0.5% THF solution. A molecular weight converted to styrene was calculated with GPC (TOSO molecular weight measuring system, detector: RI). Since polarities of acryl portion and fluorine portion were separated in opposite phases, an elution peak of fluorine portion used as seed particles was removed from a mixed elution peak of the seed polymer by a differential spectrum and a remaining portion was shown by Mw as a weight average molecular weight of acryl portion.

Then a coating was prepared by using the aqueous-dispersing composition and characteristics of a coating film were evaluated. The results are shown in Table 2.

(Preparation of Coating)

A pigment paste was prepared by mixing and dispersing 70 parts of titanium oxide (brand name CR97 available from Ishihara Sangyo Kabushiki Kaisha) as a filler, 1 part of SOLSPARSE 20000 (available from Zeneca Co., Ltd.) as a dispersing agent, 1 part of ethylene glycol as an anti-freezing agent, 0.5 part of FS ANTIFOAM 013B (available from Dow Corning Co., Ltd.) as an antifoaming agent and 27.5 parts of water. 0.5 Part of UH420 (available from Asahi Denka Kabushiki Kaisha) as a viscosity control agent and 10 parts of diethyl adipate as a film forming aid were added to 95 parts of the pigment paste and 200 parts of the above-mentioned aqueous dispersion of fluorine-containing seed polymer, followed by mixing sufficiently with a dispersing stirrer to give a white coating.

Gloss: The obtained white coating was applied on a glass plate by using a 10 mil applicator, and dried for 20 minutes in a blower dryer of 80° C. A glossiness at 60° reflection was measured by using a gloss meter (available from Suga Shikenki Kabushiki Kaisha).

Film forming property: Elastic intermediate coating (HIPROOF Intermediate Coating available from Nippon Tokushu Toryo Kabushiki Kaisha) was applied to a slate by airless spraying so that a coating amount became 250 g/m$^2$, and after drying for one day, thereto was applied the above-mentioned white coating in a constant temperature room of 5° C. with a 10 mil applicator. After drying for one week, appearance of a coating film was observed. When there is no problem with appearance, it was evaluated as ○, and when cracking occurred, it was evaluated as ×.

Alkali resistance: The obtained white coating was applied on a slate by airless spraying so that a coating amount became 120 g/m$^2$, and then dried for 20 minutes in a blower dryer of 80° C. to give a test piece. With respect to the coating film, a spot testing was made with a 5% aqueous solution of sodium hydroxide at 30° C. for one week, and chromaticity coordinates were measured with a calorimeter (CR300 available from Minolta Co., Ltd.). A difference Δb in brightness between before and after exposure was assumed to be an index for alkali resistance. The smaller the difference is, the more excellent the alkali resistance is.

Hot water resistance: To 200 parts of the above-mentioned aqueous dispersion of fluorine-containing seed polymer were added 0.5 part of UH420 (available from Asahi Denka Kabushiki Kaisha) as a viscosity control agent and 10 parts of diethyl adipate as a film forming aid, followed by mixing sufficiently with a dispersing stirrer to give a clear coating. The obtained clear coating was applied to a glass plate with a 10 mil applicator and dried for 20 minutes in a blower dryer of 80° C. to give a transparent coating film. The obtained coating film was dipped in hot water for 20 minutes and taken out. Transmittance of visible light at 600 nm through the coating film was measured and evaluated as follows.

○: Transmittance of visible light is not less than 85%

Δ: Transmittance of visible light is not less than 70% and less than 85%.

×: Transmittance of visible light is less than 70%.

Mechanical properties: The above-mentioned clear coating was applied to a polypropylene plate by using a 20 mil applicator and dried for 24 hours in a blower dryer of 80° C. to give a transparent film. With respect to mechanical properties of the film, elastic modulus and elongation at break were measured according to JIS-K6301.

EXAMPLES 2 TO 7 AND COMPARATIVE EXAMPLES 1 AND 2

Aqueous-dispersing compositions of composite resin and further coatings were prepared in the same manner as in Example 1 except that the seed polymerization was carried out by using synthetic resins (A) obtained in Preparation Examples shown in Table 2 and monomers (b) shown in Table 2, and then were evaluated. The results are shown in Table 2.

TABLE 2

|  | Example | | | | | | | Com. Ex. | |
|---|---|---|---|---|---|---|---|---|---|
|  | 1 | 2 | 3 | 4 | 5 | 6 | 7 | 1 | 2 |
| Synthetic resin (A) | | | | | | | | | |
| Preparation Example No. | 1 | 2 | 2 | 2 | 2 | 2 | 3 | 4 | 5 |
| Solid content (g) | 100 | 100 | 100 | 100 | 100 | 100 | 100 | 100 | 100 |
| Monomer (b) | | | | | | | | | |
| MMa (g) | 20 | 20 | 20 | 20 | 20 | 20 | 20 | 20 | 20 |
| BA (g) | 6 | 6 | 6 | 6 | 6 | 6 | 6 | 6 | 6 |
| AAc (g) | 1 | 1 | 1 | 1 | 1 | 1 | 1 | 1 | 1 |
| n-LM (g) | 0.1 | 0 | 0.1 | 0.5 | 3 | 6 | 0.1 | 0.1 | 0.1 |
| Mw of synthetic resin (B) (× 10$^4$) | 77 | 124 | 77 | 5.4 | 1.3 | 0.8 | 77 | 77 | 77 |
| Average particle size of composite resin (μm) | 141 | 153 | 156 | 155 | 155 | 158 | 171 | 160 | 159 |
| Mechanical properties of coating film | | | | | | | | | |
| Gloss | 74 | 68 | 73 | 71 | 74 | 76 | 69 | 65 | 62 |
| Alkali resistance (Δb) | 1.3 | 2.6 | 1.2 | 1.4 | 1.5 | 3.1 | 2.8 | 1.3 | 7.3 |
| Film forming property | ○ | ○ | ○ | ○ | ○ | ○ | ○ | ○ | × |
| Hot water resistance | Δ | ○ | ○ | Δ | Δ | Δ | ○ | × | ○ |
| Elastic modulus (kg/cm$^2$) | 59.8 | 62.3 | 66.3 | 61 | 65.7 | 63.3 | 64.2 | 51.1 | 47.5 |
| Elongation at break (%) | 102 | 175 | 183 | 185 | 210 | 205 | 202 | 13 | 201 |

EXAMPLE 8

A 1-liter four neck flask provided with a stirrer, cooling tube and thermometer was charged with 150 g of ion-exchanged water, and thereto was added 3.9 g of an aqueous solution of alkali salt of alkyl allyl sulfosuccinate (brand name ELEMINOL JS2 available from Sanyo Kasei Kogyo Kabushiki Kaisha, solid content: 38%). The mixture was heated with stirring in a water bath, and at the time when the bath temperature reached 80° C., thereto was added 1 ml of a 2% aqueous solution of ammonium persulfate and subsequently thereto was added dropwise over one hour an emulsion prepared by emulsifying a mixture comprising 80 g of methyl methacrylate (MMA), 18 g of butyl acrylate (BA), 2 g of acrylic acid (AAc) and 0.15 g of n-laurylmercaptan (n-LM) with 50 g of a 1% aqueous solution of alkali salt of alkyl allyl sulfosuccinate. After allowing to stand for 30 minutes, a part of the aqueous dispersion was sampled (S1). To those seed particles was added 2 ml of a 2% aqueous solution of ammonium persulfate and subsequently thereto was added dropwise over two hours an emulsion prepared by emulsifying a monomer mixture comprising 140 g of methyl methacrylate (MMA), 40 g of butyl acrylate (BA), 20 g of γ-methacryloyloxytriethoxysilane (MPTES) and 9 g of polyoxyethylene methacrylate (brand name RMA300M available from Nippon Nyukazai Kabushiki Kaisha) with 100 g of a 1% aqueous solution of alkali salt of alkyl allyl sulfosuccinate. Two hours after, the temperature inside the bath was elevated to 85° C. and maintained for one hour. Then after water was removed under reduced pressure to concentrate, the mixture was cooled. After adjusting pH to 7 and a solid content to 50% with ammonia water, filtration was carried out with a metal net of 300 mesh to give a bluish white aqueous-dispersing composition of acrylic resin. With respect to the aqueous dispersion, an average particle size and an intrinsic viscosity [η] of the resin of S1 were measured.

As a result, an average particle size was 152 nm and [η] was 0.88.

Then a coating was prepared by using the obtained aqueous-dispersing composition and characteristics of a coating film was evaluated.

To 200 parts of the above-mentioned aqueous-dispersing composition were added 0.5 part of UH420 (available from Asahi Denka Kabushiki Kaisha) as a viscosity control agent and 10 parts of diethyl adipate as a film forming aid, followed by mixing sufficiently with a dispersing stirrer to give a clear coating. Film forming property and water resistance of the obtained coating were evaluated by the following methods. The results are shown in Table 3.

Film forming property: MOBINYL914 (Acrylic sealer available from Hoechst Gosei Kabushiki Kaisha) was applied to a slate by airless spraying so that a coating amount became 100 g/m$^2$, and after drying for one day, thereto was applied the coating prepared above in a constant temperature room of 5° C. with a 10 mil applicator. After drying for one week, appearance of a coating film was observed. When there is no problem with appearance, it was evaluated as ○, and when cracking occurred, it was evaluated as ×.

Water resistance: The obtained clear coating was applied to a glass plate with a 10 mil applicator and dried for 20 minutes in a blower dryer of 80° C. to give a transparent coating film. The obtained coating film was dipped in 40° C. hot water for one week and taken out. Transmittance of visible light at 600 nm through the coating film was measured and evaluated as follows.

⊚: Transmittance of visible light is not less than 85%

Δ: Transmittance of visible light is not less than 70% and less than 85%.

×: Transmittance of visible light is less than 70%.

COMPARATIVE EXAMPLES 3 TO 4

Aqueous-dispersing compositions and further coatings were prepared in the same manner as in Example 8 except that an amount of n-laurylmercaptan (n-LM) was changed to those shown in Table 3. The obtained aqueous-dispersing compositions and coating films were evaluated in the same manner as in Example 8. The results are shown in Table 3.

TABLE 3

|  | Ex. 8 | Com. Ex. 3 | Com. Ex. 4 |
| --- | --- | --- | --- |
| n-LM (g) | 0.15 | 0.03 | 3.00 |
| [η] of S1 | 0.88 | 2.60 | 0.12 |
| Film forming property | ○ | X | ○ |
| Water resistance | ○ | ○ | X |

From Table 3, it can be seen that when [η] of the resin (S1) becoming a seed is not more than 0.3, water resistance is poor and when not less than 2, film forming property is lowered.

As mentioned above, the aqueous-dispersing composition of composite resin of the present invention has improved film forming property and can give a coating film being excellent in chemical resistance, water resistance and mechanical properties.

[Mixture of Aqueous Dispersions of Resin]

PREPARATION EXAMPLES 6 TO 7

The aqueous dispersions of Preparation Examples 6 and 7 were prepared in the same manner as in Preparation Example 1 except that an adding amount of ethyl acetate and polymerization time were changed as shown in Table 4. Characteristics of the aqueous dispersions are shown in Table 4.

TABLE 4

| Preparation Example No. | 6 | 7 |
| --- | --- | --- |
| VdF (% by mole) | 74 | 74 |
| TFE (% by mole) | 14 | 14 |
| CTFE (% by mole) | 12 | 12 |
| Ethyl acetate (% by weight) | 0.3 | 0 |
| Polymerization time (hr) | 33 | 25 |
| Intrinsic viscosity [η] | 0.73 | In-soluble |
| Average particle size (nm) | 126 | 125 |
| Solid content (% by weight) | 33 | 40 |

PREPARATION EXAMPLE 8
(Synthesis of Fluorine-containing Seed Polymer)

A 1-liter four neck flask provided with a stirrer, cooling tube and thermometer was charged with an aqueous dispersion obtained in Preparation Example 4 and having a solid content of the fluorine-containing polymer in an amount of 100 g, and thereto was added 3.0 g of aqueous solution of alkali salt of alkyl allyl sulfosuccinate (brand name ELEMINOL JS2 available from Sanyo Kasei Kogyo Kabushiki Kaisha, solid content: 38%). The mixture was heated with stirring in a water bath, and at the time when the bath temperature reached 80° C., to the mixture was added dropwise over one hour an emulsion prepared by emulsifying a monomer mixture comprising 20 g of methyl methacrylate (MMA), 6 g of butyl acrylate (BA), 7 g of acrylic acid (AAc) and 0.1 g of n-laurylmercaptan with a 0.5% aqueous solution of alkali salt of alkyl allyl sulfosuccinate. Further 2.2 g of a 50% aqueous solution of polyoxyethylene methacrylate (brand name RMA450M available from Nippon Nyukazai Kabushiki Kaisha) was added and immediately after that, 1 ml of a 2% aqueous solution of ammonium persulfate was added to initiate a reaction. Three hours after initiation of the reaction, the temperature inside the bath was elevated to 85° C. and maintained for one hour. Then after water was removed under reduced pressure to concentrate, the mixture was cooled. After adjusting pH to 7 and a solid content to 50% with ammonia water, filtration was carried out with a metal net of 400 mesh to give a bluish white aqueous dispersion of fluorine-containing seed polymer. With respect to the aqueous dispersion, an average particle size and a molecular weight of seed-polymerized acryl portion were measured. The results are shown in Table 5.

Molecular weight of seed-polymerized portion (acryl portion): The obtained aqueous dispersion was dried and was prepared into a 0.5% THF solution. A molecular weight converted to styrene was calculated with GPC (TOSO molecular weight measuring system, detector: RI). Since polarities of acryl portion and fluorine portion were separated in opposite phases, an elution peak of fluorine portion used as seed particles was removed from a mixed elution peak of the seed polymer by a differential spectrum and a remaining portion was shown by Mw as a weight average molecular weight of acryl portion.

PREPARATION EXAMPLES 9 TO 13

Aqueous dispersions of seed polymer of Preparation Examples 9 to 13 were prepared in the same manner as in Preparation Example 8 except that aqueous dispersions of fluorine-containing polymer were changed to those of Preparation Examples shown in Table 5.

TABLE 5

|  | Preparation Example | | | | | |
| --- | --- | --- | --- | --- | --- | --- |
|  | 8 | 9 | 10 | 11 | 12 | 13 |
| Synthetic resin | | | | | | |
| Preparation Example No. | 4 | 1 | 6 | 3 | 5 | 7 |
| Solid content (g) | 100 | 100 | 100 | 100 | 100 | 100 |
| Monomer for seed | | | | | | |
| MMa (g) | 20 | 20 | 20 | 20 | 20 | 20 |
| BA (g) | 6 | 6 | 6 | 6 | 6 | 6 |
| AAc (g) | 1 | 1 | 1 | 1 | 1 | 1 |
| n-LM (g) | 0.1 | 0.1 | 0.1 | 0.1 | 0.1 | 0.1 |
| Mw of seed-polymerized portion ($\times 10^4$) | 77 | 77 | 77 | 77 | 77 | 77 |
| Average particle size of seed polymer (nm) | 142 | 141 | 139 | 163 | 159 | 140 |

PREPARATION EXAMPLES 14 TO 15

Aqueous dispersions of seed polymer of Preparation Examples 14 to 15 were prepared in the same manner as in Preparation Example 8 except that a mixture dispersion (Preparation Example 14) of aqueous dispersions of Preparation Examples 1 and 5 or a mixture dispersion (Preparation Example 15) of aqueous dispersions of Preparation Examples 6 and 7 was used as an aqueous dispersion of fluorine-containing polymer as shown in Table 6. Those dispersions can be used as they are as the mixture of aqueous dispersions of the present invention.

TABLE 6

|  | Preparation Example | |
| --- | --- | --- |
|  | 14 | 15 |
| Fluorine-containing polymer (A1) | | |
| Preparation Example No. | 1 | 6 |
| Solid content (g) | 50 | 50 |
| Fluorine-containing polymer (F1) | | |
| Preparation Example No. | 5 | 7 |
| Solid content (g) | 50 | 50 |
| Monomer for seed | | |
| MMA (g) | 20 | 20 |
| BA (g) | 6 | 6 |
| AAc (g) | 1 | 1 |
| n-LM (g) | 0.1 | 0.1 |
| Mw of seed-polymerized portion ($\times 10^4$) | 77 | 77 |
| Average particle size of seed polymer (nm) | 157 | 143 |

EXAMPLES 9 TO 16 AND COMPARATIVE EXAMPLES 5 TO 7

The coatings were prepared by using a mixture of aqueous dispersions of synthetic resin or seed polymer shown in Table 7.

(Preparation of Coating)

A pigment paste was prepared by mixing and dispersing 70 parts of titanium oxide (brand name CR97 available from Ishihara Sangyo Kabushiki Kaisha) as a filler, 1 part of SOLSPARSE 20000 (available from Zeneca Co., Ltd.) as a dispersing agent, 1 part of ethylene glycol as an anti-freezing agent, 0.5 part of FS ANTIFOAM 013B (available from Dow Corning Co., Ltd.) as an anti-foaming agent and 27.5 parts of water. Then 0.5 part of UH420 (available from Asahi Denka Kabushiki Kaisha) as a viscosity control agent and 10 parts of diethyl adipate as a film forming aid were added to an aqueous-dispersing composition comprising 95 parts of the pigment paste and 200 parts of fluorine-containing seed polymers (C1) and (E1) shown in Table 7, followed by mixing sufficiently by using a dispersing stirrer to give a white coating. A gloss, alkali resistance, film forming property, hot water resistance and mechanical properties of the white coating were determined in the same manner as in Example 1. The results are shown in Table 7.

TABLE 7

|  | Example | | | | | | | | Com. Ex. | | |
| --- | --- | --- | --- | --- | --- | --- | --- | --- | --- | --- | --- |
|  | 9 | 10 | 11 | 12 | 13 | 14 | 15 | 16 | 5 | 6 | 7 |
| Fluorine-containing seed polymer (C1) | | | | | | | | | | | |
| Prep. Ex. No. | 9 | 9 | 10 | 10 | 10 | 10 | 10 | 11 | 8 | 8 | 12 |
| Amount[*1] (part) | 100 | 100 | 100 | 50 | 100 | 150 | 100 | 100 | 100 | 100 | 100 |

TABLE 7-continued

|  | Example | | | | | | | | Com. Ex. | | |
| --- | --- | --- | --- | --- | --- | --- | --- | --- | --- | --- | --- |
|  | 9 | 10 | 11 | 12 | 13 | 14 | 15 | 16 | 5 | 6 | 7 |
|  | (50) | (50) | (50) | (25) | (50) | (75) | (50) | (50) | (50) | (50) | (50) |
| Fluorine-containing seed polymer (E1) | | | | | | | | | | | |
| Prep. Ex. No. | 9 | 11 | 10 | 11 | 11 | 11 | 12 | 11 | 8 | 12 | 12 |
| Amount*1 (part) | 100 | 100 | 100 | 150 | 100 | 50 | 100 | 100 | 100 | 100 | 100 |
|  | (50) | (50) | (50) | (75) | (50) | (25) | (50) | (50) | (50) | (50) | (50) |
| Properties of coating film | | | | | | | | | | | |
| Gloss | 75 | 76 | 72 | 70 | 72 | 73 | 70 | 67 | 76 | 75 | 58 |
| Alkali resistance (Δb) | 2.5 | 2.5 | 1.6 | 3.3 | 1.8 | 2.7 | 3.1 | 3.6 | 9.1 | 8.3 | 8.4 |
| Film forming property | ○ | ○ | ○ | ○ | ○ | ○ | ○ | ○ | ○ | ○ | x |
| Hot water resistance | ○ | ○ | ○ | ○ | ○ | ○ | ○ | ○ | x | Δ | ○ |
| Elastic modulus (kg/cm$^2$) | 55.3 | 57.9 | 67.9 | 62.9 | 66.5 | 71.2 | 68 | 71 | 32 | 44 | 49 |
| Elongation at break (%) | 169 | 196 | 219 | 241 | 235 | 219 | 226 | 215 | 11 | 57 | 154 |

*1Figures in the parentheses are solid contents (part).

EXAMPLES 17 TO 18

White coatings were prepared in the same manner as in Example 9 by using mixtures of aqueous dispersions of seed polymer which were obtained in Preparation Examples 14 and 15, respectively, and were evaluated. The results are shown in Table 8.

TABLE 8

|  | Example | |
| --- | --- | --- |
|  | 17 | 18 |
| Preparation Example No. | 14 | 15 |
| Amount *1 (part) | 200 | 200 |
|  | (100) | (100) |
| Properties of coating film | | |
| Gloss | 74 | 72 |
| Alkali resistance (Δ b) | 1.6 | 1.8 |
| Film forming property | ○ | ○ |
| Hot water resistance | ○ | ○ |
| Elastic modulus (kg/cm$^2$) | 68 | 68 |
| Elongation at break (%) | 222 | 208 |

*1 Figures in the parentheses are solid contents (part).

PREPARATION EXAMPLE 16

A 1-liter four neck flask provided with a stirrer, cooling tube and thermometer was charged with 150 g of ion-exchanged water, and thereto was added 3.9 g of an aqueous solution of alkali salt of alkyl allyl sulfosuccinate (brand name ELEMINOL JS2 available from Sanyo Kasei Kogyo Kabushiki Kaisha, solid content: 38% ). The mixture was heated with stirring in a water bath, and at the time when the bath temperature reached 80° C., thereto was added 1 ml of a 2% aqueous solution of ammonium persulfate and subsequently thereto was added dropwise over one hour an emulsion prepared by emulsifying a mixture solution comprising 80 g of methyl methacrylate (MMA), 18 g of butyl acrylate (BA), 2 g of acrylic acid (AAc) and 0.25 g of n-laurylmercaptan (n-LM) with 50 g of a 1% aqueous solution of alkali salt of alkyl allyl sulfosuccinate. After allowing to stand for 30 minutes, a part of the aqueous dispersion was sampled (S1). To those seed particles was added 2 ml of a 2% aqueous solution of ammonium persulfate and subsequently thereto was added dropwise over two hours an emulsion prepared by emulsifying a monomer mixture comprising 140 g of methyl methacrylate (MMA), 40 g of butyl acrylate (BA), 20 g of γ-methacryloyloxytriethoxysilane (MPTES) and 9 g of polyoxyethylene methacrylate (brand name RMA300M available from Nippon Nyukazai Kabushiki Kaisha) with 100 g of a 1% aqueous solution of alkali salt of alkyl allyl sulfosuccinate. Two hours after, the temperature inside the bath was elevated to 85° C. and maintained for one hour. Then after water was removed under reduced pressure to concentrate, the mixture was cooled. After adjusting pH to 7 and a solid content to 50% with ammonia water, filtration was carried out with a metal net of 300 mesh to give a bluish white aqueous dispersion of acrylic resin. With respect to the aqueous dispersion, an average particle size and an intrinsic viscosity [η] of the resin of S1 were measured according to the methods of Preparation Example 1.

As a result, an average particle size was 152 nm and [η] was 0.42.

PREPARATION EXAMPLE 17

S1 and aqueous dispersion were obtained in the same manner as in Preparation Example 16 except that an amount of n-laurylmecaptan was changed to 0.03 g, and an intrinsic viscosity [η] of S1 was determined. [η] was 2.60

EXAMPLE 19 AND COMPARATIVE EXAMPLES 8 TO 9

Coatings were prepared by using the aqueous dispersions of Preparation Examples 16 and 17, and characteristics of a coating film were evaluated.

To 200 parts of the mixture of aqueous dispersions having components shown in Table 9 were added 0.5 part of UH420 (available from Asahi Denka Kabushiki Kaisha) as a viscosity control agent and 10 parts of diethyl adipate as a film forming aid, followed by mixing sufficiently with a dispersing stirrer to give a clear coating. Film forming property and water resistance of the obtained coatings were evaluated by the following methods. The results are shown in Table 9.

Film forming property: MOBINYL914 (Acrylic sealer available from Hoechst Gosei Kabushiki Kaisha) was applied to a slate by airless spraying so that a coating amount became 100 g/m$^2$, and after drying for one day, thereto was applied the coating prepared above in a constant temperature room of 5° C. with a 10 mil applicator. After drying for one week, appearance of a coating film was observed. When there is no problem with appearance, it was evaluated as ○, and when cracking occurred, it was evaluated as x.

Water resistance: The obtained clear coating was applied to a glass plate with a 10 mil applicator and dried for 20 minutes in a blower dryer of 80° C. to give a transparent coating film. The obtained coating film was dipped in 40° C. hot water for one week and taken out. Transmittance of visible light at 600 nm through the coating film was measured and evaluated as follows.

○: Transmittance of visible light is not less than 85%
Δ: Transmittance of visible light is not less than 70% and less than 85%.
×: Transmittance of visible light is less than 70%.

TABLE 9

|  | Ex. 19 | Com. Ex. 8 | Com. Ex. 9 |
| --- | --- | --- | --- |
| Prep. Ex. 16 | 100 | 200 | — |
| Prep. Ex. 17 | 100 | — | 200 |
| Film forming property | ○ | ○ | X |
| Water resistance | ○ | X | ○ |

From Table 9, it can be seen that even if the intrinsic viscosity [η] of the resin S1 becoming a seed is from 0.3 to 2.0, water resistance is poor in case of a single use of the resin (Comparative Example 8), and if [η] is not less than 2.0, film forming property is lowered in case of a single use of the resin.

INDUSTRIAL APPLICABILITY

The mixture of aqueous dispersions of resin of the present invention has improved film forming property and can give a coating film being excellent in chemical resistance, water resistance, mechanical properties and further hot water resistance.

What is claimed is:

1. An aqueous-dispersing composition of composite resin, which is an aqueous-dispersing composition of a composite resin (C) comprising a vinylidene fluoride copolymer (A) and a synthetic resin (B) of a monomer or monomers (b), wherein the monomer(s) (b) is a non-fluorine-containing monomer (b1) having a reactive α,β-saturated group; said composite resin (C) is prepared by seed-polymerizing the monomer(s) (b) in an aqueous medium in the presence of particles of the vinylidene flouride copolymer (A) and an intrinsic viscosity "η" of the vinylidene fluoride copolymer (A) measured at 35° C. in methyl ethyl ketone solvent is from 0.3 to 2.0.

2. The aqueous-dispersing composition of claim 1, wherein the vinylidene fluoride copolymer (A) is VdF/TFE copolymer, VdF/HFP copolymer, VdF/CTFE copolymer, VdF/TFE/CTFE copolymer or VdF/TFE/HFP copolymer.

3. The aqueous-dispersing composition of claim 1, wherein a weight average molecular weight of the synthetic resin (B) is not less than 10,000.

4. A mixture of aqueous dispersions of resin, which comprises the aqueous-dispersing composition of composite resin (C) of claim 1 and an aqueous dispersion of synthetic resin (D) having an intrinsic viscosity "η" of not less than 0.6 which is larger by 0.3 or more than the intrinsic viscosity "η" of the vinylidene fluoride copolymer (A) when the intrinsic viscosity is measured at 35° C. in a methyl ethyl ketone solvent.

5. The mixture of aqueous dispersions of claim 4, wherein the synthetic resin (D) is a fluorine-containing polymer.

6. A mixture of aqueous dispersions of fluorine-containing resin, which comprises an aqueous dispersion of a fluorine-containing seed polymer (C1) obtained by seed-polymerizing a non-fluorine-containing monomer (b1) having a reactive α,β-unsaturated group in an aqueous medium in the presence of particles of a vinylidene fluoride copolymer (A1) having an intrinsic viscosity "η" of from 0.3 to 2.0 measured at 35° C. in a methyl ethyl ketone solvent and an aqueous dispersion of a fluorine-containing seed polymer (E1) obtained by seed-polymerizing a non-fluorine-containing monomer (g1) having a reactive α,β-unsaturated group in an aqueous medium in the presence of particles of a vinylidene fluoride copolymer (F1) having an intrinsic viscosity "η" of not less than 0.6 which is larger by 0.3 or more than the intrinsic viscosity "η" of the vinylidene fluoride copolymer (A1) when the intrinsic viscosity is measured at 35° C. in a methyl ethyl ketone solvent.

7. A mixture of aqueous dispersions of resin which comprises the aqueous dispersion of composite resin composition (C) of claim 2 and an aqueous dispersion of synthetic resin (D) having an intrinsic viscosity "η" of not less than 0.6 which is larger by 0.3 or more than the intrinsic viscosity "η" of the vinylidene fluoride copolymer (A) when the intrinsic viscosity is measured at 35° C. in a methyl ethyl ketone solvent.

8. A mixture of aqueous dispersions of resin, which comprises the aqueous dispersion of composite resin composition (C) of claim 3 and an aqueous dispersion of synthetic resin (D) having an intrinsic viscosity "η" of not less than 0.6 which is larger by 0.3 or more than the intrinsic viscosity "η" of the vinylidene fluoride copolymer (A) when the intrinsic viscosity is measured at 35° C. in a methyl ethyl ketone solvent.

9. The mixture of aqueous dispersions of claim 7, wherein the synthetic resin (D) is a fluorine-containing polymer.

10. The mixture of aqueous dispersions of claim 8, wherein the synthetic resin (D) is a fluorine-containing polymer.

* * * * *